United States Patent [19]
Scott et al.

[11] Patent Number: 5,540,028
[45] Date of Patent: Jul. 30, 1996

[54] HEPA FILTER CEILING ASSEMBLY WITH IN-SITU GELATION OF SEALANT

[76] Inventors: Robert D. Scott, 1324 S. Glen Alan, West Covina, Calif. 91791; Tom Gill, 9701 Banta Ave., Anaheim, Calif. 92804

[21] Appl. No.: 270,493

[22] Filed: Jul. 5, 1994

[51] Int. Cl.$^6$ .................. E04B 9/02; B01D 46/00
[52] U.S. Cl. .............. 52/506.8; 52/506.06; 52/506.07; 52/742.13; 52/302.1; 52/775; 52/781; 55/355; 55/483; 55/484
[58] Field of Search .............. 52/302.1, 506.06–506.08, 52/743, 741.3, 745.05, 742.13, 762, 775, 780, 781; 55/355, 385.2, 483, 484

[56] References Cited

U.S. PATENT DOCUMENTS

| | | | |
|---|---|---|---|
| 3,486,311 | 12/1969 | Allan, Jr. . | |
| 3,848,385 | 11/1974 | Thompson | 52/475 |
| 4,511,380 | 4/1985 | Fetter | 55/355 |
| 4,545,793 | 10/1985 | Shuler | 55/355 |
| 4,555,255 | 11/1985 | Kissel | 55/355 |
| 4,671,811 | 6/1987 | Cadwell, Jr. et al. | 55/355 |
| 4,683,699 | 8/1987 | Larsson | 52/775 |
| 4,710,208 | 12/1987 | Ziemer et al. | 55/355 |
| 4,819,549 | 4/1989 | Gillingham et al. | 55/355 X |
| 4,860,420 | 8/1989 | Cadwell, Jr. et al. | 29/157 R |
| 4,883,511 | 11/1989 | Gustin et al. | 55/355 |
| 4,883,513 | 11/1989 | Monson et al. | 55/385.2 |
| 4,946,484 | 8/1990 | Monson et al. | 55/385.2 |
| 4,976,757 | 12/1990 | Helmus | 55/355 |
| 4,986,050 | 1/1991 | Brunetti et al. | 52/488 |
| 5,279,632 | 1/1994 | Decker et al. | 55/355 |

FOREIGN PATENT DOCUMENTS

| | | | |
|---|---|---|---|
| 0836898 | 3/1970 | Canada | 183/25 |

OTHER PUBLICATIONS

Jack L. Sheneberger, Dow Corning Corporation, *Material Safety Data Sheet* for Dielectric Gel, Part A, Sep. 8, 1989, Midland, MI.
Dow Corning Corporation, *Product Labels* (Dielectric Gel Kit–Part A & B), Midland, MI.

Primary Examiner—Robert J. Canfield
Attorney, Agent, or Firm—Louis J. Bachand

[57] ABSTRACT

A clean room ceiling having an air impervious filter support and air flow path-defining filters supported by the support, and a permanently fluid, nonevaporative non-air-flow-displaceable gel blocking air flow past the support except along the filter defined air path.

19 Claims, 3 Drawing Sheets

HEPA FILTER CEILING ASSEMBLY WITH IN-SITU GELATION OF SEALANT

TECHNICAL FIELD

This invention has to do with ceilings of manufacturing clean rooms, hospital operating rooms and other enclosed areas in which the continuous absence of even extremely small particles of contaminants is critical, e.g. during surgery and in maintaining the integrity of a manufacturing process. More particularly the invention provides the first permanently fluid, non-air displaceable seal system for sealing a HEPA filter ceiling, a seal system which enables the HEPA filters to be secured in place solely by the force of air pressure against the filters.

BACKGROUND

HEPA (High Efficiency Particulate Air) filters are well known as are installations of such filters in greatly extended banks, sometimes forming the entire ceiling of a room. These filters comprise a frame and a tightly packed filter medium within the frame. Air is forced through the filters where all but the smallest fraction of all but the smallest particulate contaminant is removed and directed toward manufacturing or surgical operations, and thereafter collected at a point below the contamination-sensitive work. While the technology of filter construction has been well-advanced, such filters are relatively small in comparison to the extent of areas to be protected. Typically filters in a ceiling are 2 feet by 4 feet and hundreds of them are deployed in a single ceiling. The problem of filtering integrity then shifts to maintaining a seal between adjacent filters, at the interface of each filter unit and its support, where seal failure permits flow of unfiltered air and negates the efficiency of the filters themselves.

SUMMARY OF THE INVENTION

Prior efforts at controlling unfiltered air flow have focused on developing a seal between the support structure and the filter frame. Such a seal must be resistant to blow-out by the pressure of air from the plenum behind the filters, i.e. be nondisplaceable by flow of pressurized air, and at the same time closely hew to the filter frame and the support so as to achieve an effective seal therebetween. Previous attempts have not been fully successful, particularly over time, as past known sealing materials evaporate physically or chemically deteriorate, and/or pull away from the frame and/or support permitting unfiltered air to bypass the filters, and/or are themselves a source of contaminants. Moreover, to ensure seal integrity it has been the practice to clamp the filters to the frame, an expensive installation complication, and one which impedes ready replacement of the filters. Replacement of these and like filters necessarily involves their removal from above the filter support grid, and reestablishing the seal is problematical as known resilient filter sealing systems tend to harden and will not move to meet a replacement filter. A permanently fluid sealing medium has not been known such as would conform itself to the filter/support connection regardless of vibration, aging of materials and removal and replacement of the filter.

It is an object therefore, to provide an improved clean room ceiling. It is another object to provide a clean room ceiling in which a plurality of filters are sealed with a common sealant supported by a ceiling grid of upwardly open troughs. It is a still further object to provide a permanently fluid sealant which is free of the hardening and loss of resilience of other seal systems for clean room ceilings. It is a further object to provide a clean room ceiling in which the filters are maintained in place solely by the force of air pressure against the filters, whereby the filters may be readily changed out and from below without need of undoing clamps and fasteners. Further, the invention sealing system bodily forms and reforms seals without use of clamps, and by remaining permanently fluid maintains seals indefinitely.

These and other objects of the invention to become apparent hereinafter are realized in accordance with the invention in a clean room ceiling open below to a clean room and open above to a pressurized air supply plenum, the ceiling comprising a filter-supporting ceiling structure impervious to air flow therethrough, a plurality of filters supported by the ceiling structure defining intended air flow paths for the pressurized air through the ceiling structure, and a permanently fluid, non-evaporative, and pressurized-air-non-displaceable gel in sealing engagement with the ceiling structure and the filters against air flow communication between the pressurized air supply plenum and the clean room except along the intended air flow paths through the filters.

In this and like embodiments, the filter-supporting structure defines a pattern of openings sized to sealably receive the filters; the filter-supporting structure comprises laterally and longitudinally extending members arranged in a grid pattern, the filters being held against the ceiling support structure solely by gravity and the force of pressurized air in the plenum; the filter-supporting structure comprises in a horizontal plane an upwardly open trough having an upstanding rib, the gel being deposited about the rib within the trough, the trough being constructed and arranged to sealably receive the filters in gel engaged relation; the filter-supporting structure comprises in a horizontal plane longitudinally and laterally extended series of upwardly open troughs arranged to define a grid having plural openings, the gel being deposited in the troughs, the filters being supported by the grid in registration with the grid openings; the trough series lie in a common plane and in open communication with each other, the gel within the troughs comprising an integral mass throughout the grid; the clean room ceiling is a first clean room ceiling, and including also a second clean room ceiling comprising a filter supporting structure and a plurality of filters supported thereby adjacently above or below the first ceiling and generally parallel thereto; the filters comprise filter media at least 95–99.99+% effective to remove particles greater than 0.3 micron in size; and the filters comprise filter media and an enclosing filter frame, the filter frame being adapted for sealing engagement with the gel.

In a more particularly preferred embodiment, the invention provides a clean room ceiling open below to a clean room and open above to a pressurized air supply plenum, the ceiling comprising a filter-supporting ceiling structure impervious to air flow therethrough, a plurality of filters supported by the ceiling structure defining intended air flow paths for the pressurized air through the ceiling structure, and a permanently fluid, non-evaporative, and pressurized-air-non-displaceable gel in sealing engagement with the ceiling structure and said filters against air flow communication between the pressurized air supply plenum and the clean room except along the intended air flow paths through the filters, the filters including a filter frame surrounding filter media, the filter frame having a front face skirt extension, suitably a continued extent of the metal, plastic or wood filter frame, adapted to be sealably engaged with the gel while the gel is sealably engaged with the filter support structure.

In this and like embodiments, the filter frame skin extension extends parallel with and surrounds the intended air flow path; the filter frame and filter frame skirt extension are generally rectangular in a plane normal to the intended air flow path, the filter support structure comprising a series of intersecting upwardly open troughs defining a series of openings generally congruent with the filter frame skirt extensions and adapted to receive the skirt extensions, the gel being disposed within the troughs in filter sealing relation to the filter support structure; the filter frame skirt extensions engage a common mass of gel; the gel mass has and retains sufficient fluidity to flow to a common depth throughout the troughs and to form and reform an air flow blocking seal about the filter frame skirt extension upon insertion and reinsertion of a filter into the gel, and to maintain the seal perdurably without shrinking away from the surfaces to be sealed; and, the filter support structure defines openings corresponding to the intended air flow paths, the filters being supported on the filter support structure disposed across the openings, retained there solely by the weight of gravity and the force of said pressurized air and free of fastening means, whereby the filters are insertable in and removable from below the ceiling without need of opening fasteners, gel forming and reforming an air flow blocking seal with the filters upon insertion of a filter into the opening in skirt extension engaged relation.

In another embodiment, the invention provides a clean room ceiling comprising a series of troughs defining air flow openings and filters comprising a frame and filter media disposed in the frame across the air flow openings, the filter having and inlet and an outlet side and a skirt extension projecting from the filter outlet side into said troughs, and permanently fluid sealant immersing said skin extension in said trough in sealing relation.

In this and like embodiments, the ceiling troughs may include local stiffening means and means to support the troughs from the room ceiling.

The invention further includes the method of sealing filters to a clean room ceiling support in which the support defines a fluid enclosure adapted to receive ceiling filters, including depositing a permanently fluid, nonevaporative, non-pressurized-air-displaceable sealant in the fluid enclosure, and engaging the filters with the sealant in the support enclosure in sealing relation to the fluid enclosure.

In the invention method, typically, there is further included arranging the ceiling support fluid enclosure into a series of contiguous rectangular units comprising upwardly open troughs having an upstanding rib and adapted to receive a pair of adjacent filters on opposite sides of the rib; selecting each filter to have a narrow edge projection on its outlet side, the edge projections being received in the ceiling support fluid enclosures for sealing the filters to the ceiling support with the sealant within the support enclosures; adding free-flowing unreacted sealant forming reactants into the enclosure, and forming the sealant in situ in the enclosures by reaction there of the reactants; and selecting as the reactants silicone resin gel precursors.

In a further embodiment the invention includes a clean room ceiling comprising a horizontally disposed, laterally and longitudinally extended array of open, interconnected rectangular supports comprising upwardly open, air flow impervious troughs, a permanently fluid sealing gel deposited in the troughs to a predetermined depth, a series of filters comprising filter flames and filter media enclosed by the filter frames, air flow impervious means connecting the filter frames with the sealing gel to the predetermined depth in laterally and longitudinally adjacent and paired relation in the troughs.

In this and like embodiments the invention includes having the gel comprise silicone resin, and having the gel formed in situ in the troughs from reactants initially having the viscosity of water, the reactants being first deposited in the troughs to mix together and flow to an even depth throughout the troughs, and thereafter react to a gel form having a higher viscosity than the reactants, the higher viscosity gel being nonevaporative and permanently flowable into the shape of said troughs in sealing engagement with the filter frame impervious means so as to maintain sealing contact over time.

The invention further provides a clean room ceiling open below to a clean room and open above to a pressurized air supply plenum, and comprising a filter-supporting ceiling structure impervious to air flow therethrough, a plurality of filters supported by the ceiling structure defining intended air flow paths for the pressurized air through the ceiling structure, a lamp assembly between adjacent filters supported by the ceiling structure, means associated with the lamp assembly to support the ceiling structure, and sealing means in sealing engagement with the ceiling structure, the filters, and the lamp assembly against air flow communication between the pressurized air supply plenum and the clean room except along the intended air flow paths through the filters.

In this and like embodiments, the invention further comprises sprinkler means extending through said ceiling support structure and arranged to sprinkle said clean room against spread of fire therein, the sprinkler means including piping arranged in association with the lamp assembly to support the ceiling support structure; the sprinkler means piping extends between longitudinally adjacent lamp assemblies, and including also bracket means air-imperviously connected to said piping and extending to ceiling support structure on either side of the lamp assembly in sealing gel carrying relation to seal the lamp assemblies against air flow past the lamp assemblies; and the ceiling support structure comprises in a horizontal plane an upwardly open trough constructed and arranged to receive in juxtaposed relation a plurality of filters and having an upstanding rib disposed between pairs of spaced filters, a bracket connecting adjacent ones of the ribs on opposite sides of the lamp assemblies, the sprinkler means piping extending between the said filters in bracket engaged relation to support the ceiling support structure; the sealing memos comprising a permanently fluid, non-displaceable gel in sealing engagement between the trough and the filters and lamp assemblies.

THE DRAWING

The invention will be further described in conjunction with the attached drawings in which.

PREFERRED MODES

Figure 1:
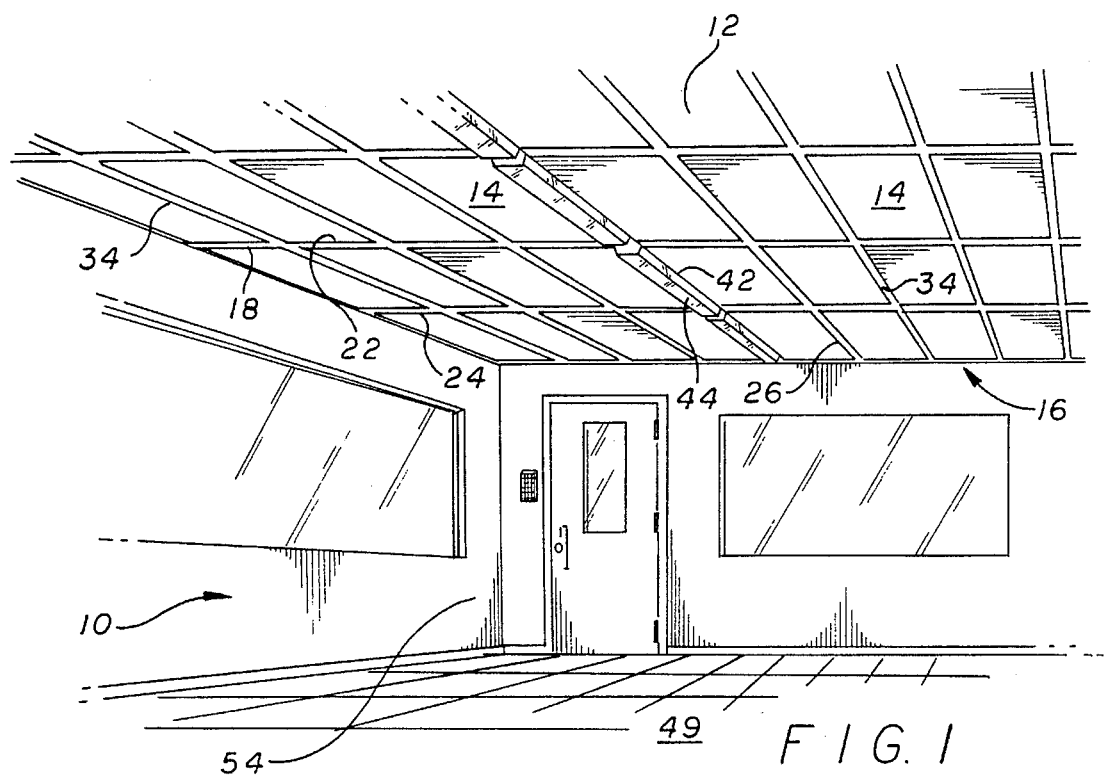
FIG. 1 is a perspective view of a clean room ceiling according to the invention.
Figure 2:
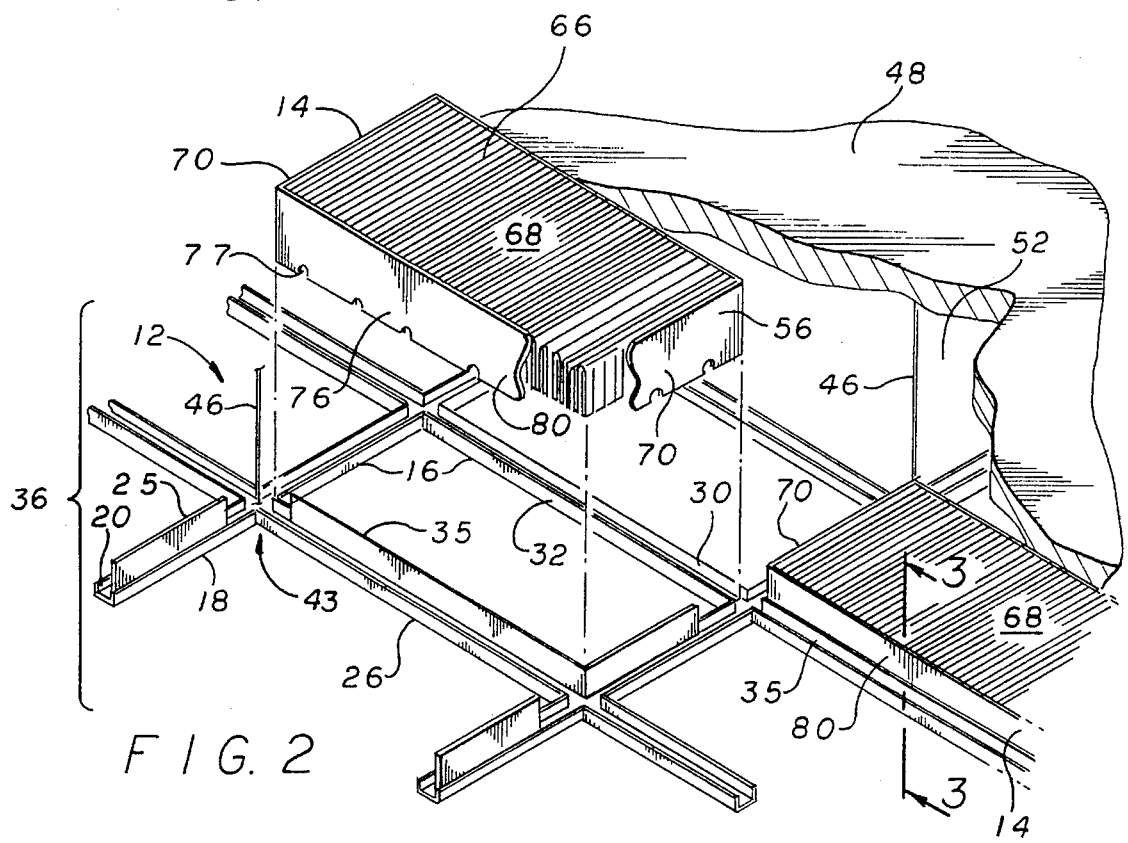
FIG. 2 is a fragmentary detail view thereof.
Figure 5:
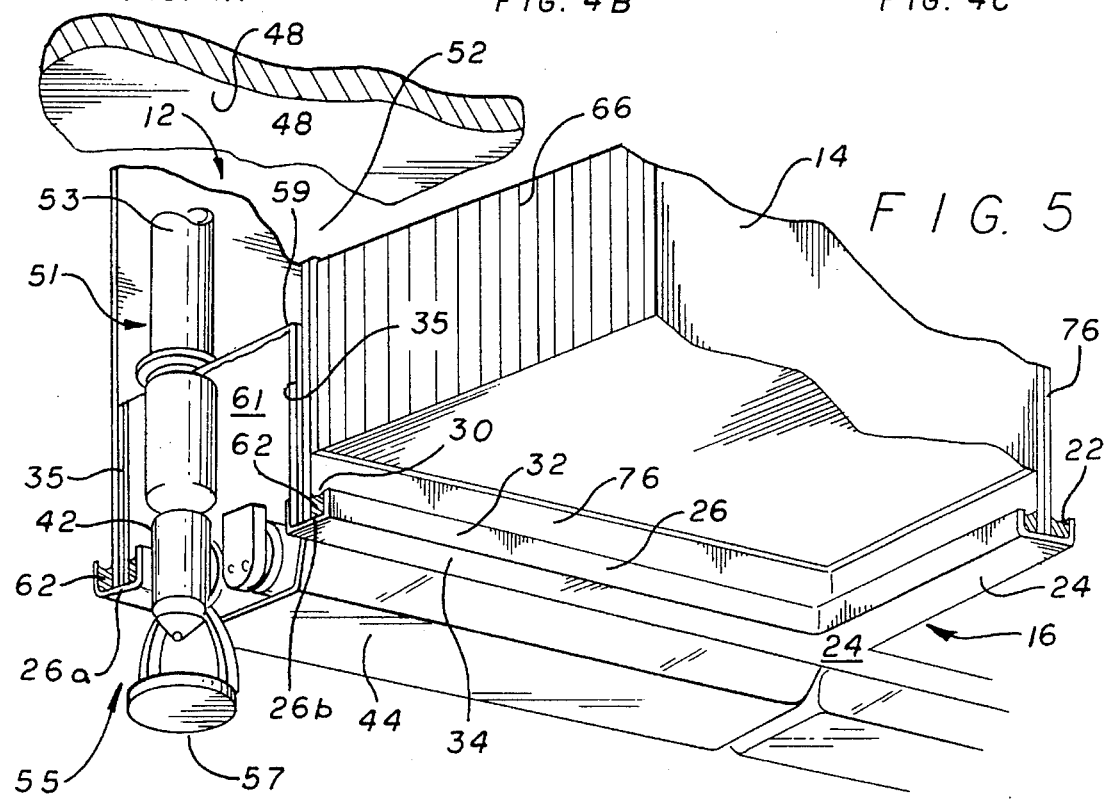
FIG. 5 is a fragmentary detail view of the invention clean room ceiling at a lamp assembly and sprinkler.

With reference to FIGS. 1, 2 and 5, clean room 10 has a clean room ceiling 12 comprising a plurality of filters 14. The filters 14 are arranged in columns and rows and supported by a clean room ceiling support structure generally indicated at 16. The ceiling support structure 16 comprises a laterally extended series of lateral support elements 18 in the form upwardly open troughs 20 having opposed side walls 22 joined and spaced by a bottom wall 24. Troughs 20 have local stiffening in the form of an upstanding rib 25 which is attached to or integral with the trough bottom wall 24 and extends parallel to the side walls 22. The ceiling support structure 16 further comprises a longitudinally extended series of longitudinal support elements 26 in the form of upwardly open troughs 30 having opposed side walls 32 joined and spaced by bottom wall 34. Troughs 30 also have local stiffening in the form of an upstanding rib 35 which like rib 25 is attached to or integral with the trough bottom wall 34 and extends parallel to the sidewalls 32. The lateral trough series elements 18 intersect in open communication with the longitudinal trough series elements 26 as shown to define in a grid pattern a single, common trough 36. The common trough 36 lies in a single horizontal plane and is of like depth, size and shape throughout except for relatively closer spacing at the location of the lamp assemblies 42 and diffusers 44, as shown. Typically the trough will be of shallow depth, with as little as a ¾" depth sufficient, but more, up to 3 inches or more, or less deep troughs 36 can be used for particular purposes. The ribs 25, 35 afford convenient anchor points 43 for wire supports 46, used, in conjunction with piping 53 as explained below, to support the HEPA ceiling 12 at an appropriate distance above the clean room floor 49 and an appropriate distance below the true clean room ceiling 48 so as to define the pressurized air plenum 52.

As best shown in FIG. 5, the invention clean room ceiling 12 provides for periodic introduction of lighting and sprinklers into the ceiling system. These features are added to the ceiling 12 without sacrifice of integrity of the ceiling against contaminants. This is achieved by having lamp assemblies 42 which are designed to intefit with the generally prevailing trough pattern with sealing achieved by the same gel sealant that seals the filters 14. Typically the ceiling 12 has a bank comprising several rows of filters 14 and then a row of lamp assemblies 42, all within the general grid pattern of the ceiling support structure 16. The gel sealant 62 as noted is common throughout, sealing both the filters 62 and the lamp assemblies 42 in the trough 36. At each lamp an overarching bracket 59 extends between the adjacent toughs 26a, 26b and connects, indeed may be integral with, the ribs 35 in these troughs. The bracket 59 closes off the area 61 above the lamp assembly 42 from air passage, and the sealant 62 in the troughs 26a, 26b blocks air flow past the bracket 59/trough 26a, 26b interconnection.

As shown in FIG. 5, the sprinkler 51 includes downcoming water piping 53 anchored to the true ceiling 48 and terminating in a conventional, heat responsive, normally closed nozzle 55 provided with a deflector 57. Bracket 59 is fastened, suitably air-tightly welded, to the downcoming piping 53, and the ceiling support structure 16 is thus further supported in position.

The clean room ceiling 12 is spaced downward from the true room ceiling 48. The true ceiling 48 and HEPA filter clean room ceiling 12 together define a pressurized air supply plenum 52 above the clean room ceiling. Pressurized air is fed into plenum 52 from a conventional source (not shown) and passes from the plenum 52 solely through the filters 14 to the interior 54 of the clean room 10 below. The ceiling support structure 16 is formed of solid, air impervious materials such as sheet metal and thus the filters 14 define the intended air flow path from the plenum 52 to the room interior 54, such that all air entering the clean room interior is filtered. In the event of leaks, i.e. air flow bypassing the filters, the filtered air integrity of the room 10 cannot be maintained. Thus the possibility of leaks between the filters 14 and the support structure 16 must be eliminated, as by the use of seals between the filters and support structure. The support structure 16 has been described above. Before describing the unique sealing means of the invention, the filters 14 will be further described.

The filters 14 each comprise a filter medium 66 of conventional design, e.g. a pleated fibrous web 68 adapted to permit air flow therethrough while blocking passage of contaminant particles greater than 0.3 micron with 95–99.99+% efficiency and higher. Typically, and as shown, the filter medium web 66 is confined in its pleated form by an enclosure, such as frame 70, usually made of a metal or plastic but may be wood, and any suitably strong, rigid material can be used, or the filter media may be such that it holds its shape without framing. The filters 14 of the present invention preferably have in addition to the standard filter medium 66 and enclosure frame 70 an added means for interfitting with the troughs 18, 26 in the form of a front face skin 76 best shown in FIGS. 2 3 and 4. The skirt 76 is suitably a continued extent of a metal filter frame and thus comprises a metal flange extending from the filter frame 70 forward, i.e. in the direction of intended air flow (See FIG. 3) and projects beyond the frame a suitable distance, e.g. ½ to 2 inches, such that the skirt 76 will reach the bottom of troughs 18, 26 while supporting the filter frame 70 above sidewalls 22, 32 of the troughs. The skirts 76 may be transversely ported at 77 as shown for purposes to appear, and define an extensive surface area 80 for purposes of sealing contact with the sealant gel 62 to be later described. The filter frames 70 can define a sealable surface directly in lieu of a skirt 76, but the illustrated arrangement is preferred in obtaining an extensive sealing surface 80, with little width of incursion into the troughs 18, 26, so that the troughs may be narrow, be less costly to construct, and occupy a minimum of ceiling 12 area relative to the filters 14.

As indicated above, the present invention uniquely employs a sealant in the form of a permanently fluid sealant, e.g. gel 62, to seal the filters 14 and support structure 16 to one another against leakage of air past the filters and support structure. The invention avoids use of pre-formed, solid and resilient gaskets which require clamping of the filters to the support, and the use of immersing liquids, such as water or water- or volatiles-containing materials which evaporate over time, or embrittle into hardened masses unable to sealably conform to the filters they supposedly are sealing.

The invention uses a sealant gel which is permanently fluid. By permanently fluid is meant that the gel will assume the shape of a container in which it is placed, and continually conform to any new shape of container, for many years, while the material has chemical integrity, i.e. remains a gel. Gels 62 of the invention are resinous and substantially non-volatile that is, have no apparent vapor pressure such that there would be a loss of volatile material to the atmosphere over time. Nonevaporative and non-volatile are terms applied to the present sealants to denote that there is no outgassing of detectible particles from the sealant. The outgassing of such particles would contaminate the clean room environment. These gel sealants are to be distinguished from solid materials which may be more or less resilient but which do not as a body flow into the shape of a container, e.g. a trough, as do the present invention gels. The present gels are to be distinguished from liquids in that these gels have little to no vapor pressure under moderate temperature and humidity conditions, such as are encountered in clean room environments. While liquids will evaporate, the present gel sealants will not evaporate under expected operating conditions in clean room environments.

Figure 4A:
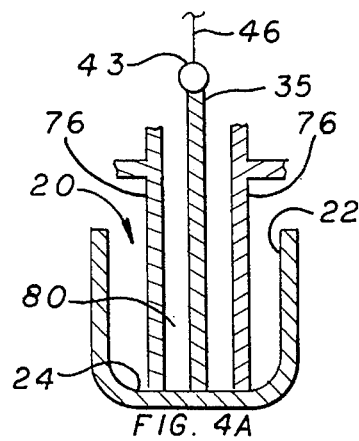
FIGS. 4A, 4B and 4C are fragmentary, detail views of the filter supporting troughs of the invention at different stages of filling with permanently fluid gel.
Figure 4B:
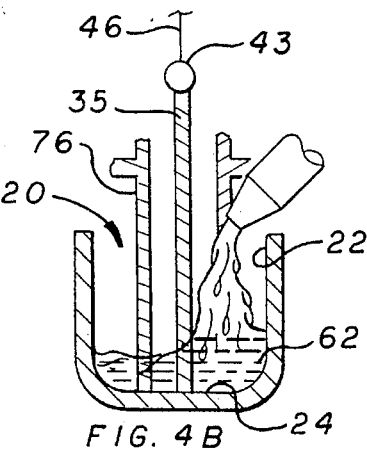
Figure 4C:
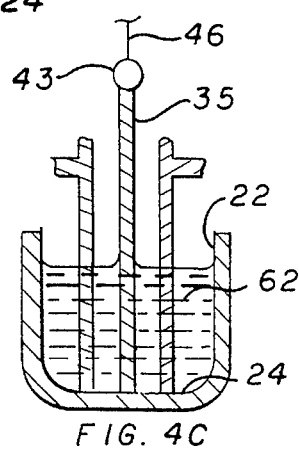

Further, the present gels are suitably formed in situ. With reference to FIGS. 4A, 4B and 4C, the gel-formers, reactants reactable to a gel, are taken from separate sources and poured into the troughs 18, 26; there the gel forming reactants react from a water-like fluid condition to the viscosity of the final gel. The low viscosity, essentially water-like, initial mixture flows readily all through the common trough 36 through the ports 77 to ensure rapid filling on both sides of a skirt 76, and levels at a depth adequate to engage, to at least ⅛ inch in depth, the skirts 76. Having distributed itself, the gel 62 continues to build viscosity to a point that it is non-water-like, i.e. cannot be displaced by air flow at clean room volumes and rates from the troughs 18, 26 in which the gel is deposited. At this point the gel 62 is no longer a water-like liquid so as to flow freely but is still fluid in the sense that it will as a mass bodily conform to the container in which it is placed, unlike merely resilient materials which only surface adapt to the opposing surface. Further increases in viscosity of the gel 62 are unnecessary. The suitability of the obtained gel 62 for resealing is tested by removing a filter 14 skin 76 from its receiving trough 26, and then replacing the skirt in the same or different location in the trough. The invention fluid gel 62 will bodily reform about the returned skirt 76 and reestablish the seal at the skirt. A typical gel is Dow Corning dielectric gel silicone resin No. Q3-6575 (Part A and Part B reactants), each available from Dow Corning, Midland, Mich.

This seal reestablishment feature enables ready removal and replacement of the filters 14, from below the ceiling 12, and without unfastening clamps and other apparatus used in conventional ceilings to ensure an absence of leaks.

It is a signal feature of the invention that the filters 14 are held in the ceiling support structure 16 by force of the pressurized air in the plenum 52. Plenum 52 air pressures are typically in the range of 1–3 inches of Hg per square inch. Thus over a single filter of e.g. 24 inches by 48 inches there is more than sufficient downward force, together with gravity, to keep the filters in place. At the same time the flow volume is spread over a wide area and there is no likelihood of the gel sealant being dislodged from the trough 36, given the viscous nature of the sealant 62, its protected position in the trough, and the low flow rate of pressurized air from the plenum 52.

Figure 7:
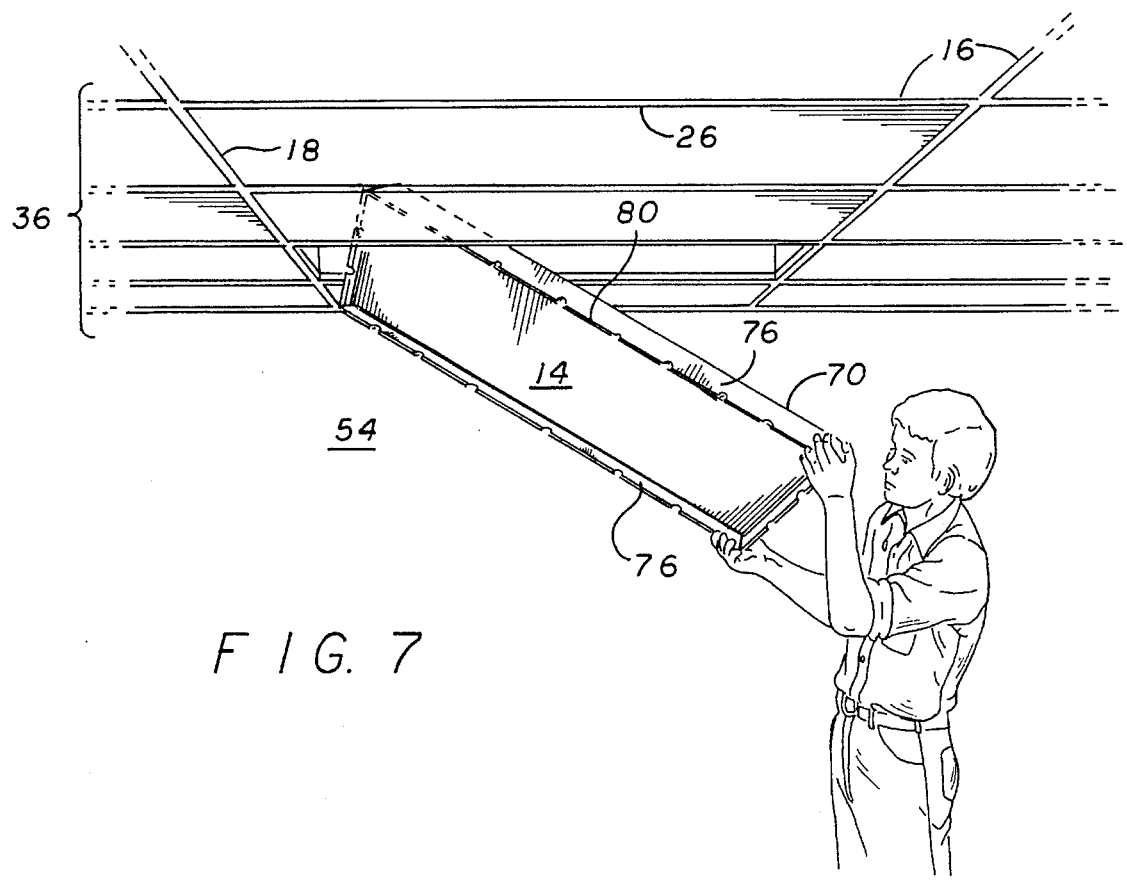
FIG. 7 is a pictorial view of the change-out of a filter unit in the invention clean room ceiling.

Since the present gel system of sealing relies on fluid conformance of a semi-solid, non-volatile material to the sealing surface 80 on the skirts 76, without need of more than gravity to hold the filters 14 sealed in place, no clamps are needed, and thus no removal of clamps is needed and the filters may be lifted out of the supporting troughs 18, 26 from below, a great convenience and saving of maintenance expense. With reference to FIG. 7, filter 14 having depending skirt 76 is lifted, cocked to a suitable angle, and withdrawn for cleaning, repair or replacement. As noted, reinsertion of the filter 14 will have the skirts 76 delve below the surface of the gel 62 until the bottom of the troughs 18, 26 is encountered.

Figure 3:
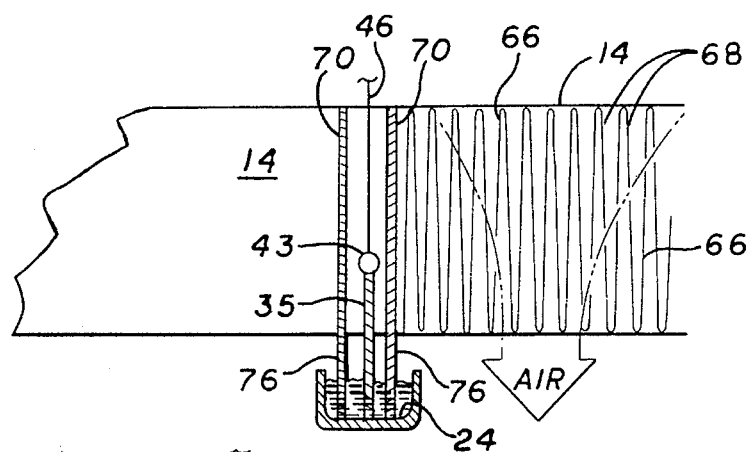
FIG. 3 is a view taken on line 3—3 in FIG. 2.

It will be noted, FIG. 3, that the filters 14 are juxtaposed above the trough 26, and that the filter skirts 76 are in like spaced relation, with the rib 35 extending partway up between the filters 14 such that the wire 46 can be connected to the rib anchor point 43.

Figure 6:
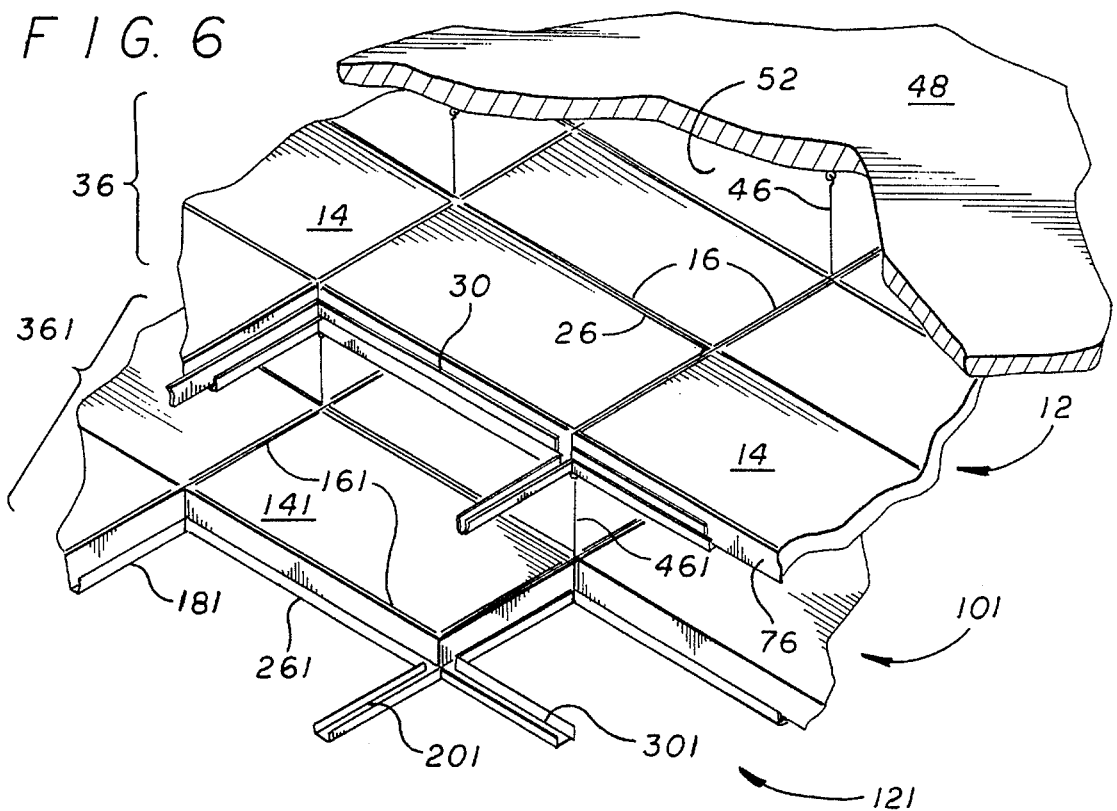
FIG. 6 is a modification of the invention clean room ceiling in which upper and lower ceilings are used.

In one embodiment of the invention, a dual HEPA ceiling is provided. In FIG. 6, the previously described ceiling 10 is in place and below that ceiling a second HEPA ceiling 101 comprising filters 121 in a filter support structure 161, also supported from the true ceiling 48, is provided. The second HEPA ceiling 101 is preferably like the ceiling 10 previously described and as shown, with like parts having like numbers plus 1, but any other form of HEPA ceiling may also be used. The FIG. 6 embodiment of the invention will be useful where higher rates of air flow and higher levels of contamination removal are desired by means of stepwise air filtering.

The invention thus achieves the foregoing objects of providing an improved clean room ceiling, one in which a plurality of filters are sealed with a common sealant supported by a ceiling grid of upwardly open troughs, and there is a permanently fluid sealant which is free of the hardening and loss of resilience of other seal systems for clean room ceilings. Further, the clean room ceiling filters are readily changed out and from below without need of undoing clamps and fasteners, as the invention sealing system forms and reforms seals without use of clamps, and by remaining permanently fluid the gel in troughs maintains the seals indefinitely.

We claim:

1. A clean room ceiling open below to a clean room and open above to a pressurized air supply plenum, said ceiling comprising a filter-supporting ceiling structure impervious to air flow therethrough, a plurality of filters supported by said ceiling structure defining intended air flow paths for said pressurized air through said ceiling structure, and first and second free flowing silicone resin gel precursors reactive with each other to a permanently fluid, non-evaporative, and pressurized-air-non-displaceable gel for sealing between said ceiling structure and said filters against air flow communication between said pressurized air supply plenum and said clean room except along said intended air flow paths through said filters, said precursors being water-like in viscosity until reacted to flow readily through said ceiling structure.

2. The clean room ceiling according to claim 1, in which said filter-supporting structure defines a pattern of openings sized to sealably receive said filters.

3. The clean room ceiling according to claim 1, in which said filter-supporting structure comprises laterally and longitudinally extending members arranged in a grid pattern, said filters being held against said ceiling support structure solely by gravity and pressure of said pressurized air in said plenum.

4. The clean room ceiling according to claim 1, in which said filter-supporting structure comprises in a horizontal plane an upwardly open trough having an upstanding rib, said gel precursors flowing about said rib within said trough, said trough being constructed and arranged to sealably receive said filters in gel engaged relation.

5. The clean room ceiling according to claim 1, in which said filter-supporting structure comprises in a horizontal plane longitudinally and laterally extended series of upwardly open troughs arranged to define a grid having plural openings, said gel precursors flowing through said troughs, said filters being supported by said grid in registration with said grid openings.

6. The clean room ceiling according to claim 5, in which said trough series lie in a common plane and in open communication with each other, said gel precursors within said troughs comprising an integral mass throughout said grid.

7. The clean room ceiling according to claim 1, in which said filters comprise filter media at least 95% effective to remove particles greater than 0.3 micron in size.

8. The clean room ceiling according to claim 1, in which said filters comprise filter media and an enclosing filter frame, said filter frame being adapted for sealing engagement with said gel reaction product of said precursors.

9. A clean room ceiling open below to a clean room and open above to a pressurized air supply plenum, said ceiling comprising a filter-supporting ceiling structure impervious to air flow therethrough, a plurality of filters supported by said ceiling structure defining intended air flow paths for said pressurized air through said ceiling structure, and first and second free flowing silicone resin gel precursors reactive with each other to a permanently fluid, non-evaporative, and pressurized-air-non-displaceable gel for sealing between said ceiling structure and said filters against air flow communication between said pressurized air supply plenum and said clean room except along said intended air flow paths through said filters, said filters including a filter frame surrounding filter media, said filter frame having a front skirt extension adapted to be sealably engaged with said gel while said gel is sealably engaged with said filter support structure, said precursors being water-like in viscosity until reacted to flow readily through said ceiling structure and about said front skirt extensions.

10. The clean room ceiling according to claim 9, in which filter frame skirt extension extends parallel with and surrounds said intended air flow path.

11. The clean room ceiling according to claim 10, in which said filter frame and filter frame skirt extension are generally rectangular in a plane normal to the intended air flow path, said filter support structure comprising a series of intersecting upwardly open troughs defining a series of openings generally congruent with said filter frame skirt extensions and adapted to receive said skirt extensions, said gel precursors being disposed within said troughs in gel forming relation to seal said filter support structure.

12. The clean room ceiling according to claim 11, in which said filter frame skirt extensions engage a common mass of gel forming precursors.

13. The clean room ceiling according to claim 12, in which said gel Precursors have sufficient fluidity to flow to a common depth throughout said troughs and to form and reform said gel in air flow blocking sealing relation about said filter frame skirt extension upon insertion and reinsertion of a filter into said gel, and to maintain said seal perdurably without shrinking away from surfaces to be sealed.

14. The clean room ceiling according to claim 9, in which said filter support structure defines openings corresponding to said intended air flow paths, said filters being supported on said filter support structure disposed across said openings and retained there solely by the weight of gravity and the force of said pressurized air and free of fastening means, whereby said filters are insertable in and removable from said openings from below said ceiling without need of opening fasteners, said gel forming and reforming an air flow blocking seal with said filters upon insertion of a filter into said opening in skirt extension engaged relation.

15. Method of sealing filters to a clean room ceiling support in which said support defines a fluid enclosure adapted to receive ceiling filters, including depositing first and second free flowing silicone resin gel recursors reactive with each other to a permanently fluid, nonevaporative, non-pressurized-air-displaceable sealant gel in said fluid enclosure, and engaging said filters with said sealant gel in said fluid enclosures in sealing relation to said fluid enclosure.

16. The method according to claim 15, including also arranging said ceiling support fluid enclosure as a series of contiguous rectangular units comprising upwardly open troughs having an upstanding rib and adapted to receive a pair of adjacent filters on opposite sides of said rib.

17. The method according to claim 15, in which each filter has a narrow edge projection on its outlet side, said edge projections being received in said ceiling support enclosure for sealing said filters to said ceiling support with said selaing gel precursors within said support enclosures.

18. A clean room ceiling open below to a clean room and open above to a pressurized air supply plenum, said ceiling comprising a filter-supporting ceiling structure impervious to air flow therethrough, a plurality of filters supported by said ceiling structure defining intended air flow paths for said pressurized air through said ceiling structure, lamp assemblies between adjacent filters, means associated with each said lamp assembly to support said ceiling structure, sealing gel sealing said ceiling structure and said filters against air flow communication between said pressurized air supply plenum and said clean room except along said intended air flow paths through said filters, sprinkler means extending through said ceiling structure and arranged to sprinkle said clean room against spread of fire therein, said sprinkler means including piping arranged in association with at least one said lamp assembly to support said ceiling structure, said sprinkler means piping extending between longitudinally adjacent lamp assemblies, and bracket means air-imperviously connected to said piping and extending to said ceiling structure on either side of said lamp assembly in sealing gel carrying relation to seal said lamp assemblies against air flow past said lamp assemblies.

19. The clean room ceiling according to claim 18, in which said ceiling structure comprises in a horizontal plane an upwardly open trough constructed and arranged to receive in juxtaposed relation a plurality of said filters and having an upstanding rib disposed between pairs of spaced filters, a bracket connecting adjacent ones of said ribs on opposite sides of said lamp assemblies, said sprinkler means piping extending between said spaced filters in bracket engaged relation to support said ceiling structure; said sealing means comprising a permanently fluid, non air-displaceable gel.

* * * * *